US011146497B2

(12) United States Patent
Larsson et al.

(10) Patent No.: US 11,146,497 B2
(45) Date of Patent: Oct. 12, 2021

(54) RESOURCE PREDICTION FOR CLOUD COMPUTING

(71) Applicant: Telefonaktiebolaget LM Ericsson (publ), Stockholm (SE)

(72) Inventors: Tony Larsson, Upplands Väsby (SE); Martin Svensson, Hägersten (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 609 days.

(21) Appl. No.: 15/101,496

(22) PCT Filed: Dec. 18, 2013

(86) PCT No.: PCT/EP2013/077102
§ 371 (c)(1),
(2) Date: Jun. 3, 2016

(87) PCT Pub. No.: WO2015/090379
PCT Pub. Date: Jun. 25, 2015

(65) Prior Publication Data
US 2016/0380908 A1    Dec. 29, 2016

(51) Int. Cl.
*H04L 12/911*  (2013.01)
*G06F 9/50*    (2006.01)
(Continued)

(52) U.S. Cl.
CPC ............ *H04L 47/70* (2013.01); *G06F 9/5072* (2013.01); *G06N 5/04* (2013.01); *H04L 67/10* (2013.01)

(58) Field of Classification Search
CPC ....... H04L 47/70; H04L 67/10; H04L 5/0078; H04L 5/0069; H04L 47/829; H04L 47/127; G06N 5/04; G06F 9/50–5094
(Continued)

(56) References Cited

U.S. PATENT DOCUMENTS 8,949,429 B1 * 2/2015 Chuang ................ G06F 9/50
709/226
9,195,508 B1 * 11/2015 Blanding ............. G06F 9/5027
(Continued)

OTHER PUBLICATIONS

Verma, Abhishek, Ludmila Cherkasova, and Roy H. Campbell. "Resource provisioning framework for mapreduce jobs with performance goals." ACM/IFIP/USENIX International Conference on Distributed Systems Platforms and Open Distributed Processing. Springer, Berlin, Heidelberg, 2011. (Year: 2011).*
(Continued)

*Primary Examiner* — Caroline H Jahnige
(74) *Attorney, Agent, or Firm* — Sage Patent Group

(57) ABSTRACT

The invention relates to a method for predicting an allocation of processing resources provided by a cloud computing module (230) to process a data set based on a predefined processing task. Input parameters are detected, the input parameters containing information about at least the data set to be processed by the cloud computing module and the processing task to be carried out on the data set. A model is selected from a plurality of different models provided in a model database (130), each model providing a relationship between the data set processing task and a predicted allocation of the processing resources. The allocation of the processing resources is predicted based on the selected model and based on the input parameters.

18 Claims, 6 Drawing Sheets

(51) Int. Cl.
*G06N 5/04* (2006.01)
*H04L 29/08* (2006.01)

(58) Field of Classification Search
USPC .......................................... 718/104
See application file for complete search history.

(56) References Cited

U.S. PATENT DOCUMENTS

| | | | |
|---|---|---|---|
| 2009/0198473 A1* | 8/2009 | Wasser | G06F 11/3452 702/181 |
| 2013/0013328 A1 | 1/2013 | Donovan et al. | |
| 2013/0086273 A1 | 4/2013 | Wray et al. | |
| 2013/0219068 A1* | 8/2013 | Ballani | G06F 9/5061 709/226 |
| 2014/0040913 A1* | 2/2014 | Wuttke | G06Q 10/0631 718/104 |
| 2014/0229221 A1* | 8/2014 | Shih | G06Q 10/06313 705/7.23 |

OTHER PUBLICATIONS

Office Action issued in corresponding EP Application No. 13814882.0 dated Feb. 13, 2019, 07 Pages.

* cited by examiner

RESOURCE PREDICTION FOR CLOUD COMPUTING

TECHNICAL FIELD

The present invention relates to a method for predicting an allocation of processing resources provided by a cloud computing module to process a data set based on a predefined processing task and to a system therefore.

BACKGROUND

Cloud computing is becoming increasingly important for processing data sets. In a cloud computing module, processing resources such as different computers connected over a network or carrying out a processing task on a data set. The cloud computing module can be accessed via a communication network such as the internet and the different computing resources may also be connected through the communication network, e.g. the internet. However, the different processing resources may also be connected via other communication networks, such as a local area network.

Cloud computing provided by a cloud computing module is based on the concept of a sharing of resources. The user or customer of a cloud computing module provides a data set and is interested in having carried out a certain processing task on the data set by the cloud computing module.

In the currently provided cloud computing services provided by different service providers, a user normally pays a fixed price per processing resource and per hour. Furthermore, a user can implement the algorithm/processing task to be carried out. These systems are very flexible but are difficult to handle. Other cloud computing services are easier to understand and easier to implement, but are less flexible. However, in any of the systems the user does not know in advance how much computing resources are needed to execute a given processing task.

Accordingly a need exists to be able to predict the use or allocation of processing resources in a cloud computing module.

SUMMARY

This need is met by the features of the independent claims. Further embodiments are described in the dependent claims.

According to a first aspect a method for predicting an allocation of processing resources provided by a cloud computing module is provided to process a data set based on a predefined processing task. According to one step, input parameters are detected wherein the parameters contain information about at least the data set to be processed by the cloud computing module and the processing task to be carried out on the data set. Furthermore, a model is selected from a plurality of different models provided in a model data base, each model providing a relationship between the data set processing task and a predicted allocation of the processing resources. The allocation of the processing resources is then predicted based on the selected model and based on the input parameters.

Based on different models in model database it is possible to predict the allocation of the processing resources by the cloud computing module taking into account input parameters such as the data set and the processing task carried out on the data set. The model is selected taking into account the detected input parameters. Based on the input parameters, it is checked in the model database whether a model can be found that can predict the allocation of the processing resource for the given data set and the processing task. The models provide a relationship between the input parameters and the resources required for performing the required task.

The predicting step may comprise the step of suggesting at least one of a processing resource configuration and the time needed by the suggested processing resources to carry out the processing task on the data set taking into account the input parameters and available processing resource configurations provided by the cloud computing module. The available processing resource configurations indicate the possible combinations of available processing resources available to the cloud computing module and of available processing tasks.

When a user is interested in a prediction for the allocated processing resources, the user may additionally input as additional input parameter a processing resource configuration for the cloud computing module, such as the indication to use this number of processors or servers or may provide a processing time frame for the processing time, such as the data set should be processed within a given time frame. During the prediction step the other additional parameter may then be calculated. In this embodiment the parameters may contain an additional input parameters which contains information about one of a processing resource configuration for the cloud computing module and a processing time frame of the processing time needed by the cloud computing module to carry out the predefined processing task. The predicting step then comprises the step of predicting the other of the processing resource configuration and processing time frame taking into account the input parameters, the available additional input parameter and the available processing resource configurations. When the user input contains a desired processing resource configuration, the prediction step includes this prediction of a time frame, and when the additional input parameter indicates a time frame, a processing resource configuration will be suggested that can be used to carry out the processing task on the data set.

The prediction step may be based on a historical database. A historical database may be provided containing information about historical processing events, each processing event comprising the information which processing task was carried out on a historical data set, which processing resources were allocated for processing the historical data set and information about a time frame needed for the processing. The information of each historical processing event can be stored in a corresponding meta data element. Thus, for each historical processing event a meta data element exists, the meta data element describing what type of processing task was performed, which hardware configuration was used, how much time it took to execute the task, the CPU utilization etc. The historical data processing events help to generate the models which help to predict the use of the processing resources.

Furthermore, it is possible that a test data set is processed using one of the processing tasks and one of the available processing resource configurations. The time frame is then determined needed to carry out the predefined processing task on the test data set and the allocated processing resource configuration and the time frame needed to carry out the task is stored as a meta data element in the historical database. Here, it may be checked whether enough historical processing events are available. With the use of a test data set new historical processing events can be generated together with the corresponding meta data element. The meta data element of the test data set can help to generate new models or to adapt existing models which can be used for a prediction.

It may be determined, based on the available processing tasks and available processing resources provided by the cloud computing module, whether enough meta data elements are provided for the available processing resource configurations. When it is determined that for one of the available processing resource configurations not enough meta data elements are available to generate a model used to predict the allocation of the processing resources for said one processing resource configuration, the generation of a test data set is initiated which is processed with said one processing resource configuration in order to generate a meta data element for the generated test data set. A model is then generated based on the generated meta data element which allows the resource allocation for said one processing resource configuration to be predicted. The generation of the test data set can include to select one test data set out of a reservoir of test data sets or can include to generate a dataset by mutating/extrapolate an existing dataset or by generating one according to a known distribution.

If it is detected that for a certain combination of processing hardware and processing task not enough meta data exist, the generation of a test data set may be initiated to generate meta data for the missing processing resource configuration. It is furthermore possible that based on the already existing meta data elements and the existing processing tasks and processing resources a prediction of the allocation of the processing resources is possible using a combination, e.g. a weighted combination of already existing models.

The different models of the model data base can be generated. For the generation of a model, a classification function may be used describing the relationship between the data set processing task and the predicted allocation of the processing resources based on the information how much processing resources were allocated for carrying out different processing tasks on historical data sets. For generating a model, a training phase may be carried out based on a predefined processing task and processing resource configuration. In this training phase the generated models are evaluated. This is possible by, e.g., randomly selecting historical data sets from the historical database and by comparing what a model will output compared to the result stored in the historical database. Furthermore, it may be checked at intervals whether for the available processing resource configurations enough models are provided in the model database. By way of example, it may be possible that the processing hardware by the cloud computing module is updated and new processing resources have become available. It is then checked at intervals whether enough models are available in the model database to predict the resource allocations for all possible and available processing resource configurations. Furthermore, it may be checked at intervals whether for the available processing resource configurations the models provided in the model database have to be updated. When the processing tasks or the processing hardware changes over time, it may be necessary to update the different models.

The available processing tasks and available processing resources may be input by an operator or administrator of the cloud computing module when a configuration of the prediction system is carried out. It is possible to determine based on the available processing resources and available processing tasks the available processing resource configurations. In this context, it may be possible not to take into account all possible combinations of processing tasks and resource configurations as some combinations may not be useful or may be unrealistic. By way of example, for some of the processing tasks, certain hardware configurations/processing resources may not be useful at all. The operator of the cloud computing module may set policies that help to avoid that too many processing resource configurations are generated and that only reasonable combinations of processing resources and processing tasks are generated.

Furthermore, the predicted allocation of the processing resources can be compared to the actual allocation of the processing resource when the predefined task is finally carried out on the data set. If it is determined that the predicted allocation differs from the actual allocation of the processing resources by more than a predefined threshold, an amendment of the model used for the prediction can be initiated. In this step it is determined how accurately the prediction is possible. If the result is not good enough, a new model training phase may be initiated to improve the prediction for the future.

The invention furthermore relates to a system configured to predict the allocation of the processing resources provided by the cloud computing module. The system comprises an input configured to detect an input of input parameters, the input parameters containing information about at least the data set to be processed by the cloud computing module and the processing task to be carried out on the data set. Furthermore, a model database is provided containing a plurality of different models, each model providing a relationship between the data set processing task and a predicted allocation of the processing resources. A predicting unit is configured to select one of the different models based on the input parameters and configured to predict the allocation of the processing resources using the selected model and based on the input parameters.

The predicting unit may work as mentioned above and a test processing unit may be provided to generate the meta data elements for the historical database as discussed above.

It should be understood that the different features which have been described above and further features which will be described further below with reference to a detailed description may be used alone or may be used in connection with any of the other features described in the present invention. Each of the features may be used in the described context, however, each feature may also be used in a different context or alone.

BRIEF DESCRIPTION OF THE DRAWINGS

The invention will be described in further detail with reference to the accompanying drawings.

DETAILED DESCRIPTION

In the following, concepts according to embodiments of the invention will be explained in more detail by referring to the accompanying drawings. The illustrated concepts relate to the prediction of an allocation of processing resources for a cloud computing module based on input parameters such as the processing task and the data set to be processed and based on models that were generated based on historical processing tasks and hardware configurations which help to understand the relation between the used resources, such as the CPU use, the disk use, the memory use and the time, and the accomplished task. The model is then used to predict resource allocation and/or time for new data processing tasks. The user provides at least information about the data set to be processed and the processing task to be carried out. The processing task can include algorithms such as a random forest algorithm, support vector machine algorithm, an algorithm based on neural networks. It should be understood that any other algorithm may be used.

Figure 1:
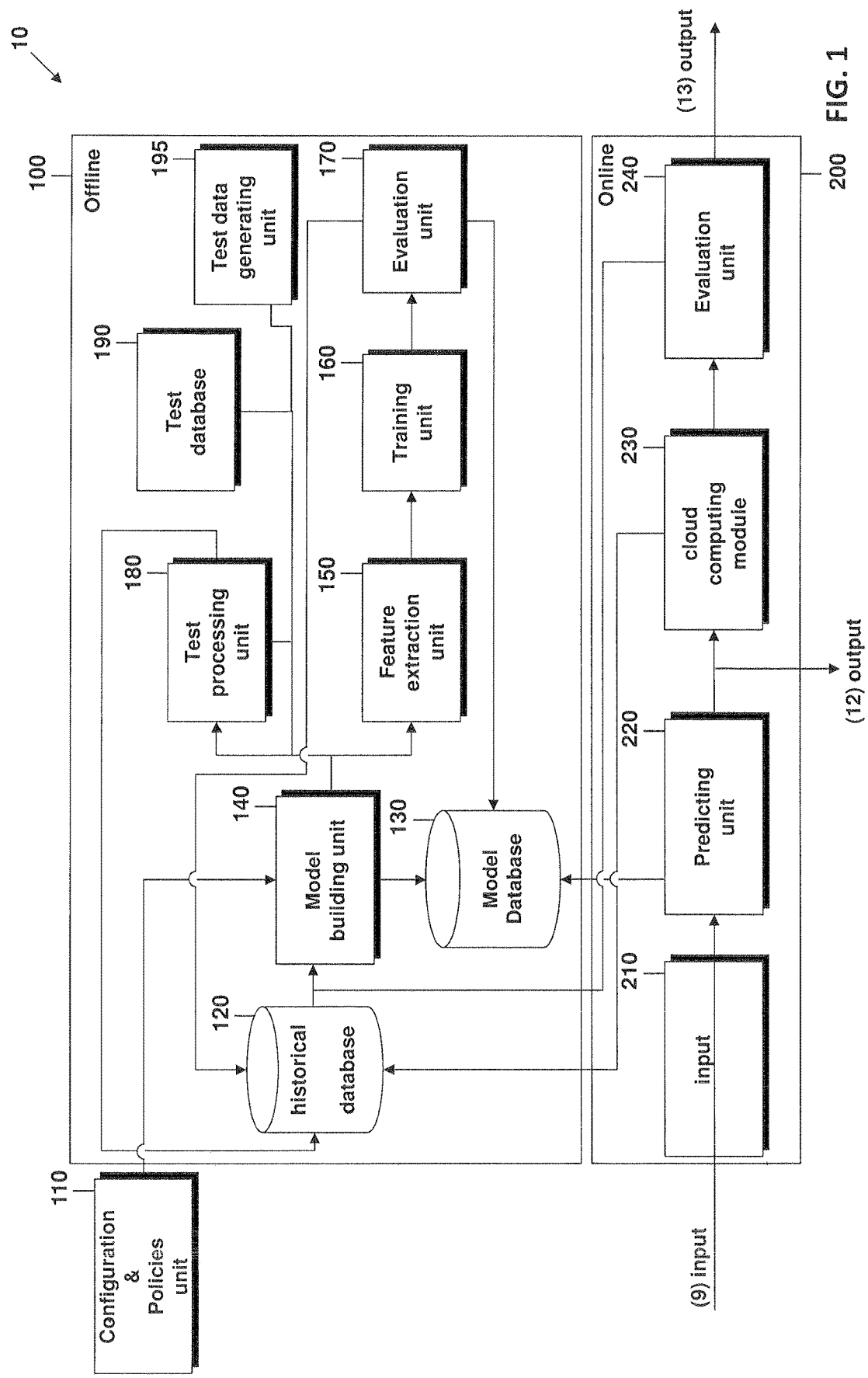
FIG. 1 schematically illustrates a system that can predict a resource allocation for a cloud computing module.

The user which is interested in the prediction can choose or indicate an algorithm. Additionally, the user may furthermore indicate parameters about the processing resources to be used, such as the number of processing units, or may indicate a time frame in which the user wishes the processing task, also called analytics task hereinafter, to be completed. A system that can be used to predict an allocation of processing resources is shown in FIG. 1. The system 10 uses a plurality of historical data sets and corresponding meta data elements and uses the historical processing resource configurations to generate models that help to understand the relation between input parameters 9 input by a user in an input unit 210 of the system 10 and the resources required for performing the processing task. The input detected by an input unit 210 can contain one of the following parameters input by a user of the system 10: the algorithm or processing task to be carried out, information about the data set to be processed. The user may additionally input parameters relating to the processing task/algorithm. Optionally, the user may input the time frame or the maximum time allowed for the processing. Furthermore, the user may want to indicate the processing resources that are used to carry out the processing task.

Other parameters input by the user may be by way of example the output format, the output location etc. The system will then predict the parameters not contained in the input.

As will be explained in further detail below, the system 10 will, based on this input and based on models provided in a model database 130, suggest a hardware configuration and/or time estimation to the end user. The models in the model database 130 are generated using historical processing events stored in a historical database 120. If the user accepts to continue with the suggested configuration, the processing task will be launched on as many processing resources needed to accomplish the task within the given time frame. The system furthermore decides on the type of processing resources such as processing resources with high or low memory, the number of CPU cores, and the needed disk capacity may also be determined.

The system also uses border conditions for different input parameters so that the user cannot specify impossible conditions such as to process one petabyte (1 PB=$10^{15}$ bytes) in one second. The models contained in the model database 130, which are trained on historical processing events, may decide on these borders, but the currently available processing capacity will also be used to be able to compensate when the load is high.

The output indicated by reference numeral 12 in FIG. 1, in a first step, contains a predicted allocation of processing resources and, when the user agrees to carry out the processing task, the output 13 will contain the results of the processing task carried out by cloud computing module 230.

As shown in FIG. 1, the system 10 comprises an offline part 100 and online part 200. In the following, we specify in further detail the offline part 100. An operator or administrator of the system 10 may use the configuration and policies module 110 to input a number of configuration options and policies. Here, the administrator who controls the system can control what processing tasks or algorithms are provided by the system. Furthermore, the configuration options and policies include the possible hardware configurations available in this system 10.

Figure 6:
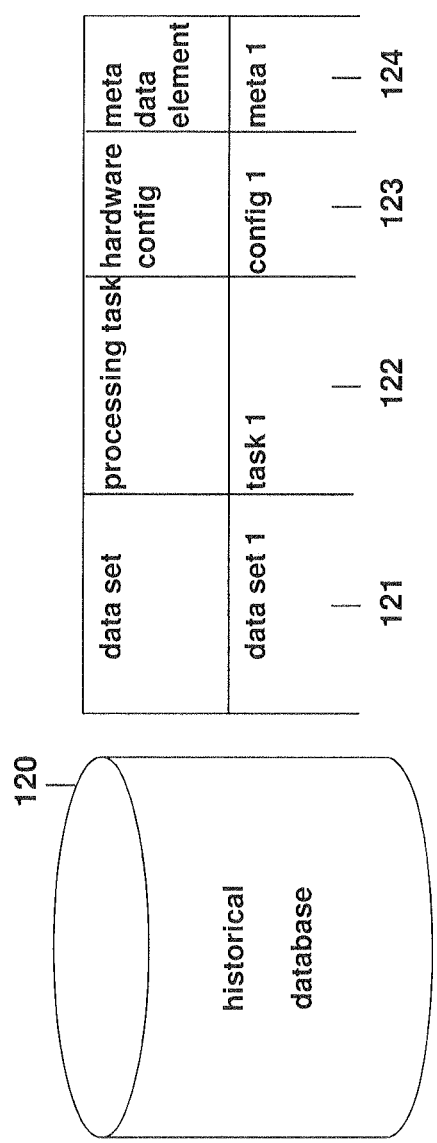
FIG. 6 schematically shows a more detailed view of the historical database.

These policies are used by a model building unit 140 which decides how, what and when certain offline tasks should be carried out meaning when tasks have to be carried by the offline part 100. The model building unit 140 will, based on the configured processing tasks and processing resources, decide if the system should launch its own processing tasks for certain configurations to generate a test data set or a model of the model data base 130 or if it should train one of the models used to predict the resource allocation for combinations for which already enough historical data sets are provided in the historical data base 120. The model building unit, based on the available processing tasks and available processing resources, determines whether enough meta data elements are provided for the available processing resource configurations. If the model building unit determines that for a certain processing resource configuration, e.g. a certain hardware configuration combined with a certain processing task, not enough meta data elements are available in the historical database 120 to generate a model that can be used to predict the allocation of the processing resources for the identified configuration, the model building unit initiates the generation of a test data set which is processed with the identified processing resource configuration. The test data set is then used to generate a meta data element for the generated test data set. The meta data element describes what type of processing task was performed, what hardware configuration was used, how long the execution took, information about the CPU utilization. This meta data element is then stored in the historical database 120 and the processing of the test data set is added to the historical processing events stored in the historical database 120. A historical database 120 is schematically shown in FIG. 6. The historical database comprises different pieces of information. By way of example, information 121 about the data set that was processed, information 122 about the processing task that was carried out, information 123 about the hardware configuration or processing resources used for the processing task and—not shown—the time frame needed to execute the processing task. For each historical processing event a meta data element 124 exists which summarizes the required information.

Referring back to FIG. 1 as stated above, when the model building unit 140 determines that for a possible or needed combination of processing resources and processing task no model exists in the model database 130, and if not enough meta data are provided in the historical database 120 to generate a model, the generation of a meta data element for the processing of a test data set is initiated with the configuration for which it was determined that no model exists in the database 130.

The offline part 100 furthermore comprises a test processing unit 180 which will, based on the input from the model building unit 140 and based on test data sets stored in a test database 190, launch real world analytics or processing tasks to match all given available processing tasks and hardware configurations. This processing unit 180 will run as many processing tasks needed to gather enough information so that it is possible to generate accurate models which can be used for the resource prediction. The test data set can be generated in a test data generating unit 195. The test data generating unit 195 can either select a test data set from a reservoir of test data sets, e.g. stored in the test data base. Furthermore, unit 195 may extrapolate an existing seed dataset to a desired size of the dataset and with desired parameters or may generate a dataset according to a known distribution, e.g. with a normal distribution.

The model building unit 140, for generating the models in the model database, launches training phases when enough historical data sets are provided in the historical database 120. The training phase can include the steps of a feature extraction by a feature extraction unit 150. This unit 150, based on the given task and the processing resources, will extract and transform all data into a suitable format that can be used to train predicting unit 220. This transformation will depend on the exact algorithm used for the training, but also on the fact what parameters are the target parameters for the prediction task. The possible options for the target attribute are the processing task plus the time frame or the processing task plus the processing resource configuration. In training unit 160 the training of a system will take place. The evaluation unit 170 will evaluate the model generated by the model database in order to ensure that it works well enough. By way of example, this may be done by randomly selecting new samples from the historical database 120 and by comparing what the model will output compared to the result stored in the historical database.

The input from the evaluation unit 170 and the input from the model building unit 140 will help to fill the model database 130 with models that are used for the prediction. Each model classifies and provides a relationship between a processing task and an allocation of processing resources.

The online part 200 is the part of the system that the end user or customer will interact with. The input by the user is detected by input 210 and predicting unit 220 will check if there is a prediction model in the model database 130 that can predict the given task or not. If no model can be found that can be used to predict the required processing resource configuration, an error may be returned to the user saying that the system cannot fulfill this requirement at the moment. If yes, the processing task is executed by the cloud computing module 230. All meta data for the processing task is then stored in the historical database 120 to be used for the offline part as mentioned above.

In the embodiment shown the cloud computing module is indicated as being located in the online task. It should be understood that the cloud computing module may be provided separated from the other parts as inter alia discussed later on in connection with FIG. 4.

When the cloud computing module has performed the required task, the result to be returned to the end user is evaluated by evaluation unit 240. The evaluation unit evaluates how accurately the resource utilization could be predicted. A bad result, e.g. if the predicted resource allocation differs from the actual resource allocation by more than a predefined threshold, can trigger a new training phase to adapt the models used for the prediction.

Figure 2:
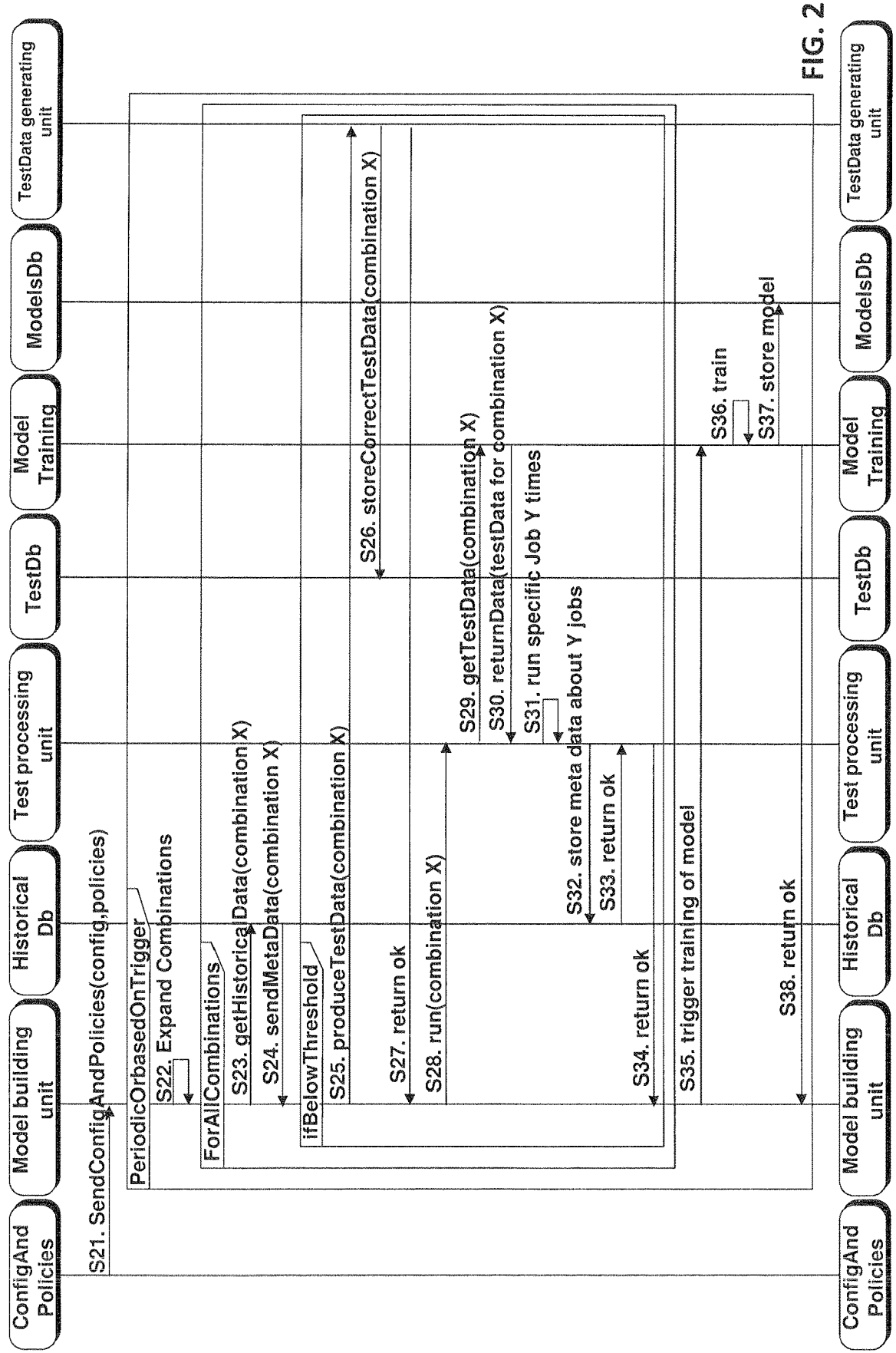
FIG. 2 schematically illustrates a message exchange for generating models for a model database used to predict the resource allocation.

In connection with FIG. 2 some of the processing steps carried out by the offline part will be discussed in more detail.

In unit 110, the configuration and policies are sent from the configuration and policies to the model building unit 140. By way of example, the processing resource may contain one large machine, one small machine. A differentiation in the data sets is provided by saying that a data set may smaller than 200 GB or bigger than 200 GB. Furthermore, sparse data may be used. As possible processing algorithm, the algorithm k-means may be provided. As a policy, the administrator may set that all combinations of hardware, data set and algorithms may be used to generate the possible processing resource configurations. In step S22, the model building unit then expands the provided information to actual configurations. In the above example this would mean that a first processing resource configuration would be one large machine, data set smaller than 200 GB, sparse data, k-means. A second configuration would be one large machine, data set bigger than 200 GB, sparse data, k-means. A third configuration would be one small machine, data set smaller than 200 GB, sparse data, k-means. A fourth configuration would be a small machine, data set bigger than 200 GB, sparse data, k-means. A fifth configuration would be one small and one large machine, data set smaller than 200 GB, sparse data, k-means, and a sixth configuration would be one small and one large machine, data set bigger than 200 GB, sparse data, k-means.

When the number of possible hardware resources and the number of processing tasks becomes higher, the available processing resource configurations may be selected such that not too many combinations are possible and that processing resource configurations, i.e. a combination of a certain processing resource with a certain processing task, may be excluded if the use of such a processing resource configuration can hardly be expected. In step S23, the historical executions are retrieved from the historical database 120. In this third step the model building unit asks for any historical processing events for the given configuration and the corresponding meta data elements inter alia indicate how long a certain configuration needed to execute a certain task.

The meta data about the different configurations is sent back to the model building unit 140. The next steps S25 to S34 are provided to generate, based on a test data set, the corresponding meta data element in order to generate a model used for the prediction of a certain processing resource configuration for which no model or not enough models exist. As shown in step S25, a test data set is generated by the test data set generating unit 195. If there are too few historical data sets for a given configuration, a test data set needs to be created. The test data set is created based on the parameters for the given configuration. By way of example, in the above mentioned example for configuration 6 a data set larger than 200 GB with sparse data may be created. In step S26, the test data set is stored in the database 190.

In step S27, the generation of the test data is acknowledged to the model building unit. In step S28, the processing is submitted to the test processing unit 180 where the processing is carried out on the test data set. In step S29, the test processing unit 180 retrieves the data from the test database 190 and in step S30 the test data set is returned to the test processing unit. The processing task is executed several times in step S31 to get a good estimate on the time it takes. In S32, the historical processing task is stored in the historical database 120. In the above mentioned example, configuration 6 will be stored together with its execution time. The historical database acknowledges the storing of the historical processing event. In step S34, the model building is informed of the generation of the historical processing event and is informed that the generation of the meta data for the historical data set is completed.

In step S35, the model building unit triggers the training of the new model for predicting execution times based on different configuration parameters. In step S36, the model is trained by using the data in the historical database using units 150-170. In step S37, a new model is stored in the model database and the storage is acknowledged in step S38 to the model building unit.

Figure 3:
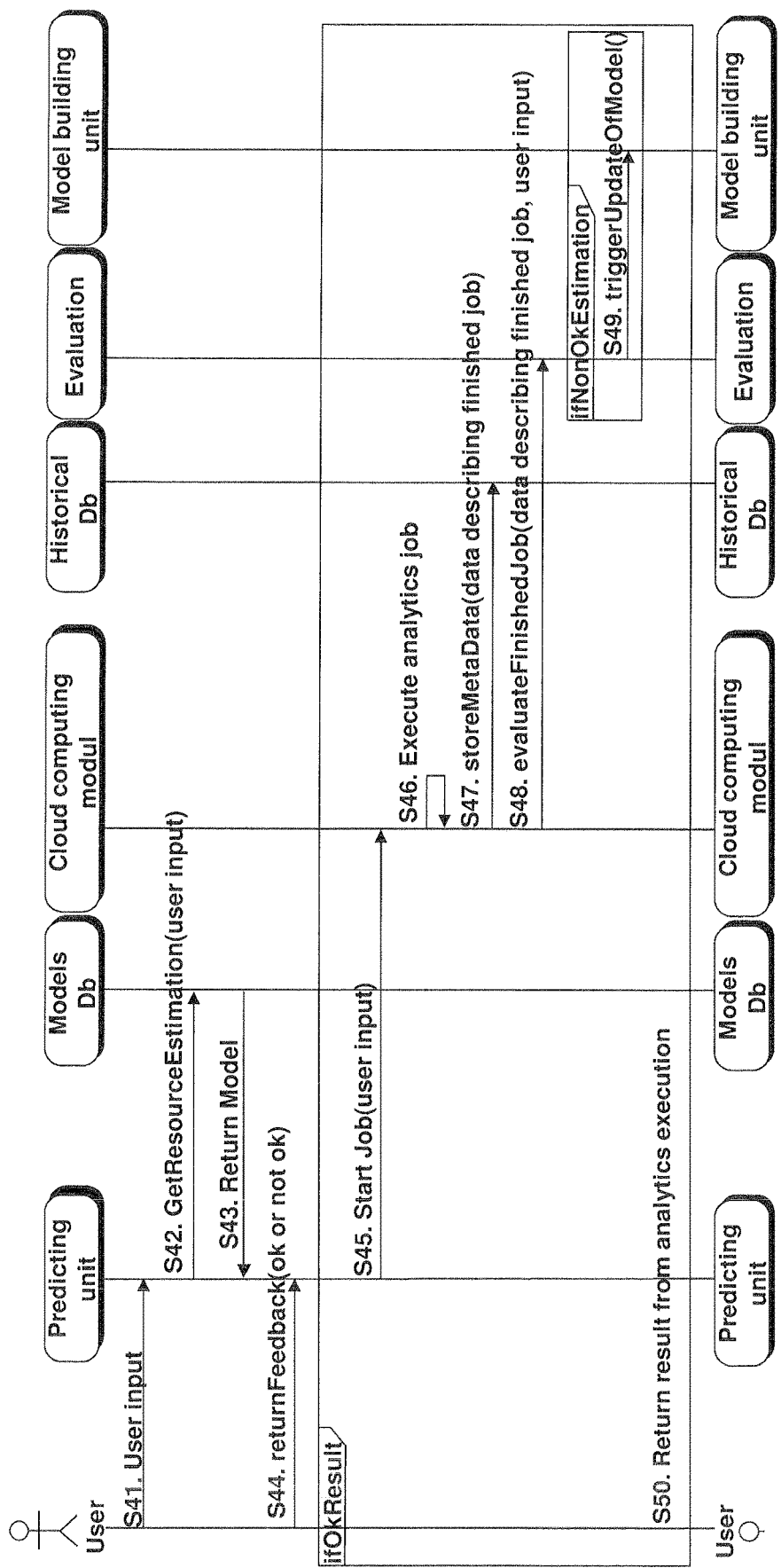
FIG. 3 schematically shows a message exchange when a user requests a processing task by the cloud computing module.

In connection with FIG. 3, the interaction with the user requesting a resource prediction is shown in more detail.

As shown in step S41, a user will input parameters into predicting unit 220 using input 210. The input may comprise information such as the processing task to be carried out, information about data set. Additionally, the input may either additionally comprise, as additional input parameter, a desired processing resource configuration or a processing time frame in which the processing should be carried out. In step S42, the predicting unit accesses the model database to find a model with which the prediction can be carried out. The identified model then is returned to the predicting unit in step S43 where the prediction is carried out. The predicting unit 220 then informs the user in step S44 about the predicted resource allocation meaning that it informs the user at least about the time frame and the processing resource allocation used during a time frame. When the user agrees to the proposed processing resource configuration, he can confirm that the processing task can be carried out (not shown in the Figures) and the cloud computing module is requested in step S45 to start the processing task. In step S46, the processing task is executed and the metadata generated for the completed processing task is stored in the historical database in step S47. The result can also be provided to the evaluation unit in step S48 which evaluates whether the prediction is in agreement with the finished task. If this is not the case, the model building unit is informed in step S49 where an amendment of the model used for the prediction is initiated.

As was explained above, the model building unit 140 generates the models which are used to predict the allocation of the processing resources. For generating a model, the model building unit 140 can carry out a certain training of a model in order the capture the relation between the input parameters input by the user and the resources required to process a data set taking into account the input parameters. The training is done on historical processing tasks stored in the historical database. Each historical data set comprised in the historical database comprises the following attributes:

An algorithm used for the processing task is provided. Preferably for each for the different processing tasks, different data sets have been processed. A possible processing task or algorithm is, by way of example, SVM (support vector model) algorithm, random forest algorithm, algorithm based on neural networks, a decision tree algorithm, a requestion algorithm. Preferably, thousands of samples are provided for each algorithm.

Furthermore, input parameters specific for the type of processing task used are provided, by way of example, how many trees should be build when a random forest algorithm is used.

The amount of data processed. This information includes inter alia the number of rows as well as the number of attributes provided for each row. This information can include the information how much elements are provided in a single data set.

The resources used when processing the task. This information can include the number of servers, the type of server used for the processing, the RAM usage, the number of processing cores used, the utilization of each processing core, the disc usage during the processing and the time spent for the entire job as well as the time spent for specific parts of the job. By way of example, the time needed for the map face and the time needed for the reduce face.

The above mentioned data can then be sent to the training unit 160 that builds a prediction model that is able to predict resource usage for a new processing task. The training can be used to define a target, variable for the prediction, e.g. what should the predictor try to predict. The prediction can predict the processing time frame, the allocated resources and/or the price to be paid by the user for the predicted processing. It should be understood that only one of these parameters or several of these parameters may be predicted. When a model is built, it is possible not to use the active dataset but to use a sample of the dataset by randomly selecting subelements, e.g. rows of the original dataset to create a smaller, more manageable dataset.

The result of the training is a model that can be used to estimate the resource usage on a new processing task. The meta data describing the new processing task, the new processing task will be input to the model and the result will be the resource usage based on the model.

In one embodiment, the model may predict the hardware configurations that best fulfill the time and operation constrains by a user. The model works by deciding on a fixed number of model configurations, which may be expanded over time. By way of example, we have different configurations like:

Configuration 1: 1CPU, 8 cores, 16 GB RAM, 256 GB SST
Configuration 2: 2CPU, 16 cores, 32 GB RAM, 512 SST
Configuration N (4CPU, 64 cores, 1 TB RAM, 2TB SST)×2 servers Each configuration will effectively be a target class and when the models are trained, the input data are run on all available configurations, to set at least one of a time and price output. During the application, the model will predict which class or hardware configuration best fits the input parameters. The initial set of target class will represent the available hardware that is available in the current deployment. This can be expanded when new configurations are added and made available to the user. This may, however, require that the model is retrained so that it can be understood when to use the new configurations.

Furthermore, a retraining of the model may be carried out using the above described model.

The predictor may output at least one of a predicted price, a time frame and a hardware resource setup for the processing task. When the user has agreed to finally do the job and when the processing task is executed, the actual time it took to execute the processing task is known. Furthermore, the price has been determined based on the pricing of the hardware resources. When these numbers deviate too much from the predicted values, a retraining of the models may be initiated.

The predicting unit shown in FIG. 1 will be responsible for setting the price for the new processing task. This is done by feeding the metadata for the new processing task through the model and to get a resource estimation for the task. This resource estimation can then be mapped for costs based on e.g. current hardware costs, electricity, software, system load and any other parameter needed to perform the task.

Figure 4:
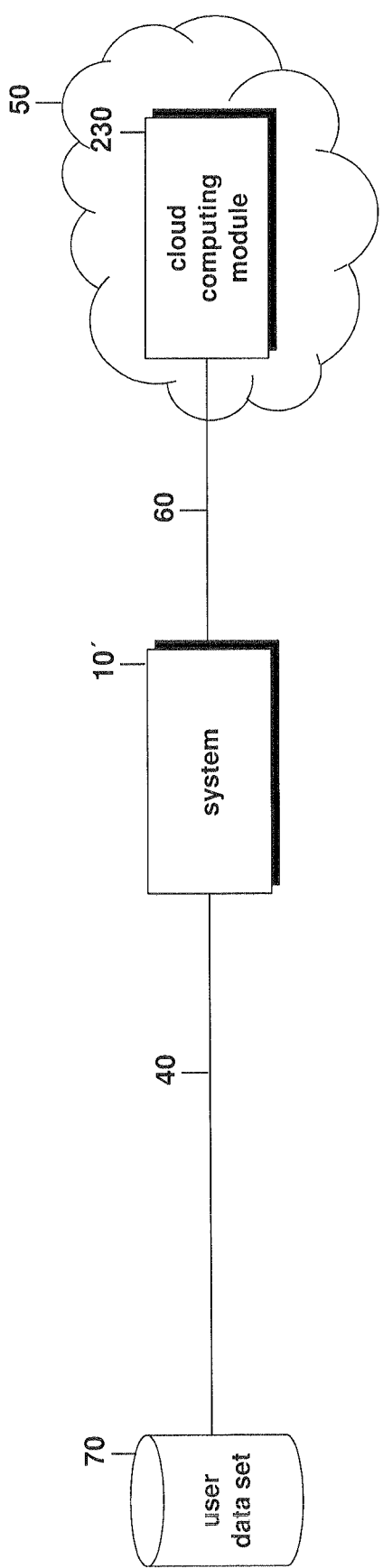
FIG. 4 schematically shows a further embodiment of the system of FIG. 1.

In connection with FIG. 4, another embodiment of the system shown in FIG. 1 is shown. A user having a user data set 70 can input the user data set into the system 10'. The system 10' corresponds to the system shown in FIG. 1, however, the cloud computing module 230 is provided in the cloud 50. This means, that the system 10' is connected to the cloud computing module via communication network 60. The data set 70 the user wants to process may be input into the system via network 40, e.g. the internet. However, if the user data set is too large to be uploaded to the system 10' via the internet, the data set 70 may also be provided to the system in a different way, e.g. by sending the data set stored on storage elements such as hard discs to the system where it is uploaded to the system 10'. The above described uploading mechanism may also apply to the system shown in FIG. 1.

Figure 5:
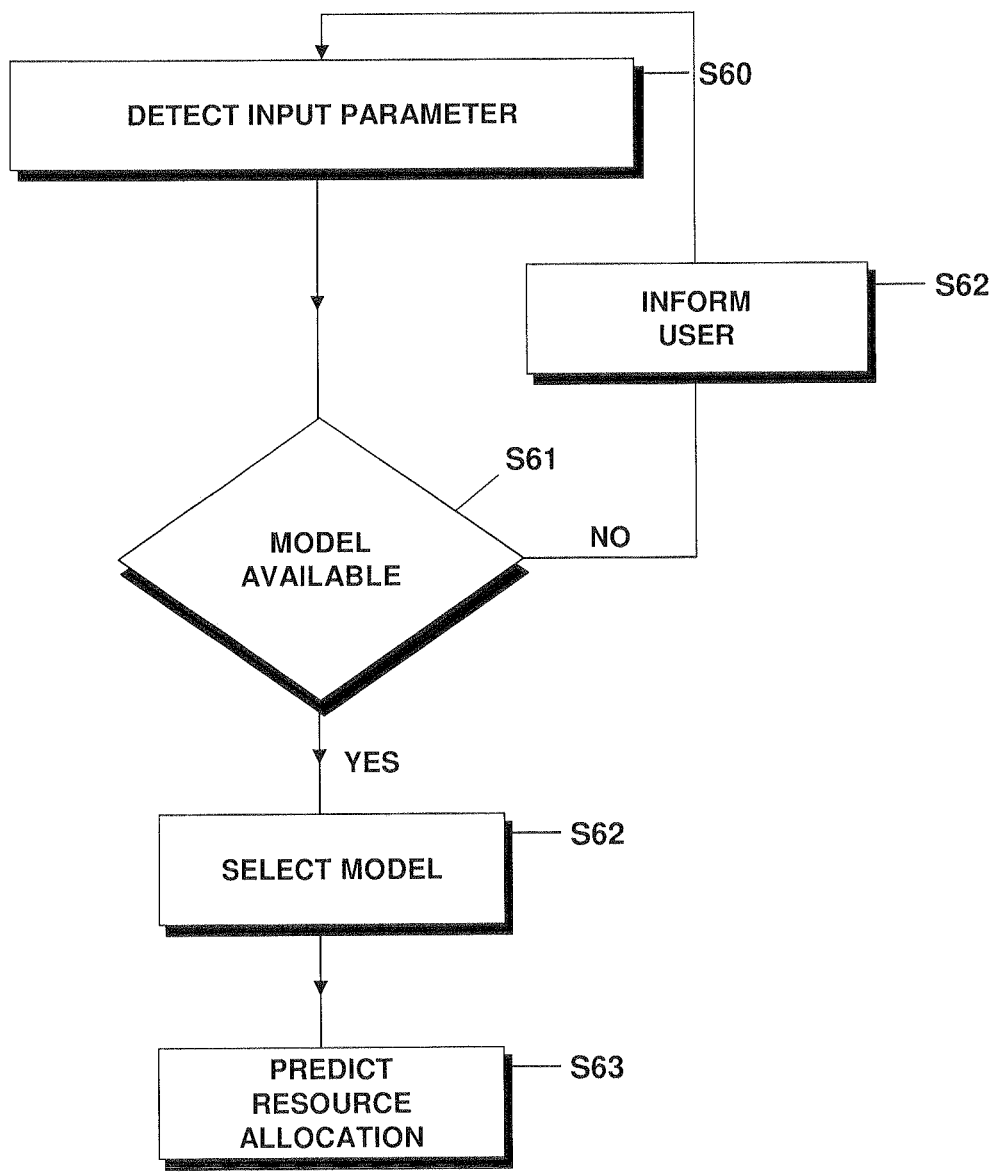
FIG. 5 schematically shows a flowchart including steps carried out by the system shown in FIG. 1.

In FIG. 5, a flow chart is schematically shown which indicates the main steps carried out by the predicting system as shown in FIG. 1 or 5. In step S60, the input parameters containing the information about the data set to be processed are detected by the system based on the detected input parameters. It is checked in step S61 whether a model is available that can be used to predict the resource allocation for the provided input parameters. If this is not the case, the user may be informed in step S62 that a prediction of the allocation of the processing resources is not possible. The system then returns to step S60. At the same time, not shown in FIG. 6, a test data set may be generated or identified in order to generate meta data in the historical data base which can then be used to generate a model which can be used to predict the resource allocation.

If it is detected in step S61 that a model is available, a model is selected in step S62 based on the input parameters. The model is then used in step S63 to predict the resource allocation. The user of the system can determine which of the parameters should be predicted. It is possible that the user only provides a data set and the processing task and asks for a minimum time frame or a minimum price. The user may also only input the data set and the processing task and the system can then identify a model that best fits the input parameters using a reasonable time frame and a reasonable processing resource configuration for the provided data set. In another embodiment, the user may additionally input either the time frame or the processing resource configuration, e.g. the hardware configuration and the system then predicts the other parameter that is not input by the user.

Summarizing, the invention offers an easy-to-understand model for a user who wants to analyze a data set. The invention furthermore provides and maintains a flexibility so that the user can control which algorithm is used and the other parameters influencing the processing of the data set.

The invention claimed is:

1. A method for predicting an allocation of processing resources provided by a cloud computing module, the method comprising:
   detecting input parameters containing information about at least a data set to be processed by the cloud computing module and a predefined processing task to be carried out on the data set, wherein the detecting is based on limiting the input para meters to border conditions determined by a plurality of different models provided in a model database, and wherein each model of the plurality of different models provides a relationship between at least one of predefined processing tasks and a predicted allocation of the processing resources;
   based on a determination that a model of the plurality of different models used to predict the allocation of the processing resources for the detected input parameters, is not available in the model database:
   determining, based on a plurality of available processing resource configurations provided by the cloud computing module, that not enough meta data elements are available to generate the model, and in response, initiating generation of a test data set, wherein the test data set is defined by one or more parameters of an available processing resource configuration of the plurality of available processing resource configurations, wherein the plurality of available processing resource configurations indicates possible combinations of the processing resources and the predefined processing tasks available to the cloud computing module;
   processing the test data set using the processing resources and the predefined processing task in order to generate a meta data element for the test data set;
   determining a time frame needed to carry out the predefined processing task on the test data set;
   generating the model based on the time frame and the processing resources allocated to carry out the predefined processing task on the test data set; and
   predicting the allocation of the processing resources based on the generated model; and
   based on a determination that a model of the plurality of different models used to predict the allocation of the processing resources for the detected input parameters, is available in the model database:
   selecting the model from the plurality of different models provided in the model database; and
   predicting the allocation of the processing resources based on both the selected model and the detected input parameters.

2. The method of claim 1, wherein the predicting the allocation of the processing resources based on both the selected model and the detected input parameters comprises suggesting at least one of a processing resource configuration and a time needed by the processing resources of the suggested at least one processing resource configuration to carry out the predefined processing task on the data set, taking into account the detected input parameters and the plurality of available processing resource configurations provided by the cloud computing module.

3. The method of claim 2:
   further comprising providing a historical database containing information about historical processing events, each historical processing event comprising information about:
   which of the predefined processing tasks was carried out on a historical data set;
   which processing resources were allocated for processing the historical data set; and
   a further time frame needed for the processing of the historical data set;
   wherein the information about each historical processing event is stored in a corresponding meta data element.

4. The method of claim 2, further comprising storing the allocated processing resources and the further time frame needed to carry out the predefined processing task as a meta data element in the historical database.

5. The method of claim 2:
   wherein the detected input parameters contain an additional input parameter, the additional input parameter containing information about one of the plurality of available processing resource configurations and the time needed by the suggested at least one processing resource configuration to carry out the predefined processing task, and
   wherein the suggesting comprises suggesting another processing resource configuration and the time needed to carry out the predefined processing task taking into account the detected input parameters, the additional input parameter, and the plurality of available processing resource configurations.

6. The method of claim 1, further comprising:
generating the plurality of different models provided in the model database; and
generating a classification function for a given model of the plurality of different models, wherein the classification function describes a relationship between the predefined processing task corresponding to the given model and the predicted allocation of the processing resources, based on both the selected model and the detected input parameters, corresponding to the given model based on information about how much processing resources were allocated for carrying out different processing tasks on historical data sets.

7. The method of claim 6, further comprising checking in intervals whether the plurality of different models provided in the model database is enough for the plurality of available processing resource configurations and/or have to be updated.

8. The method of claim 2:
wherein the processing resources and the predefined processing tasks are identified, and
wherein the plurality of available processing resource configurations is determined based on the processing resources and the predefined processing tasks.

9. The method of claim 1, further comprising:
comparing the predicted allocation of the processing resources, based on both the selected model and the detected input parameters, to an actual allocation of the processing resources when the predefined processing task is carried out on the data set; and
initiating, in response to determining that the predicted allocation of the processing resources based on both the selected model and the detected input parameters differs from the actual allocation of the processing resources by more than a predefined threshold, an amendment of the model used for the prediction.

10. A system configured to predict an allocation of processing resources provided by a cloud computing module, the system comprising:
a processor; and
memory containing instructions executable by the processor whereby the processor is configured to:
detect input parameters containing information about at least a data set to be processed by the cloud computing module and a predefined processing task to be carried out on the data set, wherein the detection is based on limiting the input para meters to border conditions determined by a plurality of different models provided in a model database, and wherein each model of the plurality of different models provides a relationship between at least one of predefined processing tasks and a predicted allocation of the processing resources;
based on a determination that a model of the plurality of different models used to predict the allocation of the processing resources for the detected input parameters, is not available in the model database, the processor is configured to:
determine, based on a plurality of available processing resource configurations provided by the cloud computing module, that not enough meta data elements are available to generate the model, and in response, initiate generation of a test data set, wherein the test data set is defined by one or more parameters of an available processing resource configuration of the plurality of available processing resource configurations, wherein the plurality of available processing resource configurations indicates possible combinations of the processing resources and the predefined processing tasks available to the cloud computing module;
process the test data set using the processing resources and the predefined processing task in order to generate a meta data element for the test data set;
determine a time frame needed to carry out the predefined processing task on the test data set;
generate the model based on the time frame and the processing resources allocated to carry out the predefined processing task on the test data set; and
based on a determination that a model of the plurality of different models used to predict the allocation of the processing resources for the detected input parameters, is available in the model database, the processor is configured to:
select, from the model database containing the plurality of different models, the model; and
predict the allocation of the processing resources using the selected model and based on the detected input parameters.

11. The system of claim 10, wherein:
the instructions are such that the processor is further configured to suggest at least one of a processing resource configuration and a time needed by the processing resources of the suggested at least one processing resource configuration to carry out the predefined processing task on the data set, taking into account the detected input parameters and the plurality of available processing resource configurations provided by the cloud computing module.

12. The system of claim 11:
further comprising a historical database containing information about historical processing events, each historical processing event comprising information about:
which of the predefined processing tasks was carried out on a historical data set;
which processing resources were allocated for processing the historical data set; and
a further time frame needed for the processing of the historical data set,
wherein the information about each historical processing event is stored in a corresponding meta data element.

13. The system of claim 12, wherein the instructions are such that the processor is further configured to store the allocated processing resources and the further time frame needed to carry out the predefined processing task as a meta data element in the historical database.

14. The system according to claim 11, wherein:
the detected input parameters contain an additional input parameter, the additional input parameter containing information about one of the plurality of available processing resource configurations and the time needed by the suggested at least one processing resource configuration to carry out the predefined processing task; and
the instructions are such that the processor is further configured to suggest another processing resource configuration and the time needed to carry out the predefined processing task taking into account the detected input parameters, the additional input parameter, and the plurality of available processing resource configurations.

15. The system of claim 10, wherein:
the instructions are such that the processor is further configured to generate the plurality of different models provided in the model database; and
to generate a given model of the plurality of different models, the instructions are such that the processor is further configured to generate a classification function describing a relationship between the predefined processing task corresponding to the given model and the predicted allocation of the processing resources, based on both the selected model and the detected input parameters, corresponding to the given model based on information about how much processing resources were allocated for carrying out different processing tasks on historical data sets.

16. The system of claim 15, wherein the instructions are such that the processor is further configured to check in intervals whether the plurality of different models provided in the model database is enough for the plurality of available processing resource configurations and/or have to be updated.

17. The system of claim 15, wherein the instructions are such that the processor is further configured to:
identify the processing resources and the predefined processing tasks; and
determine the plurality of available processing resource configurations based on the processing resources and the predefined processing tasks.

18. The system of claim 10, wherein the instructions are such that the processor is further configured to:
compare the predicted allocation of the processing resources, based on both the selected model and the detected input parameters, to an actual allocation of the processing resources when the predefined processing task is carried out on the data set; and
responsive to determining that the predicted allocation of the processing resources based on both the selected model and the detected input parameters differs from the actual allocation of the processing resources by more than a predefined threshold, trigger an amendment of the model used for the prediction.

* * * * *